US009660474B2

United States Patent
Sturnfield

(10) Patent No.: US 9,660,474 B2
(45) Date of Patent: May 23, 2017

(54) ENERGY STORAGE SYSTEM WITH GREEN MAINTENANCE DISCHARGE CYCLE

(71) Applicant: Palladium Energy, Inc., Woodridge, IL (US)

(72) Inventor: Lucas H Sturnfield, Downers Grove, IL (US)

(73) Assignee: Inventus Power, Inc., Woodridge, IL (US)

( * ) Notice: Subject to any disclaimer, the term of this patent is extended or adjusted under 35 U.S.C. 154(b) by 275 days.

(21) Appl. No.: 14/629,888

(22) Filed: Feb. 24, 2015

(65) Prior Publication Data

US 2016/0248127 A1    Aug. 25, 2016

(51) Int. Cl.
*H02J 7/00* (2006.01)
*H01M 10/42* (2006.01)
*H01M 10/46* (2006.01)

(52) U.S. Cl.
CPC .......... *H02J 7/007* (2013.01); *H01M 10/425* (2013.01); *H01M 10/46* (2013.01); *H02J 7/0063* (2013.01); *H02J 7/0065* (2013.01); *H01M 2010/4271* (2013.01)

(58) Field of Classification Search
CPC .............. H01M 10/46; H01M 10/425; H01M 2010/4271; H02J 7/007; H02J 7/0063; H02J 7/0065
USPC .......................................... 320/127, 129–136
See application file for complete search history.

(56) References Cited

U.S. PATENT DOCUMENTS

| | | | |
|---|---|---|---|
| 5,656,915 A * | 8/1997 | Eaves ................. | H01M 10/482 320/118 |
| 6,700,352 B1 * | 3/2004 | Elliott ................... | H02J 7/0003 320/130 |
| 7,199,556 B1 | 4/2007 | Benckenstein et al. | |
| 7,274,170 B2 | 9/2007 | Benckenstein et al. | |
| 7,279,867 B2 | 10/2007 | Benckenstein et al. | |
| 8,054,043 B2 | 11/2011 | Yano | |
| 8,110,941 B2 | 2/2012 | Boss et al. | |
| 8,148,943 B2 | 4/2012 | Forslöw | |
| 8,541,905 B2 | 9/2013 | Brabec | |
| 8,610,382 B2 | 12/2013 | Goldammer et al. | |
| 8,649,935 B2 | 2/2014 | Kubo et al. | |
| 8,901,888 B1 | 12/2014 | Beckman | |
| 8,922,166 B2 | 12/2014 | White et al. | |
| 2004/0135545 A1 * | 7/2004 | Fowler ................. | B60L 11/185 320/118 |

\* cited by examiner

*Primary Examiner* — Nathaniel Pelton
(74) *Attorney, Agent, or Firm* — Babcock IP, PLLC

(57) ABSTRACT

An energy storage system with an energy storage cell coupled to a battery management system provided with a charge control circuit, a discharge control circuit and a maintenance discharge control circuit. The maintenance discharge control circuit including a voltage booster coupled to a constant current/constant voltage (CC/CV) regulator. Each of the charge control circuit, the discharge control circuit and the maintenance discharge control circuit are coupled between the battery management system and a host power rail. The voltage booster is operable to raise a voltage from the energy storage cell to a CC/CV regulator input voltage greater than a voltage of the host power rail, enabling the CC/CV regulator to provide a selected maximum voltage and corresponding maximum current to the host power rail during a maintenance discharge cycle of the energy storage cell.

20 Claims, 2 Drawing Sheets

ENERGY STORAGE SYSTEM WITH GREEN MAINTENANCE DISCHARGE CYCLE

BACKGROUND

Field of the Invention

The invention relates to an electrical power storage system. More specifically, the invention relates to an energy storage system with a "green" environmentally friendly maintenance discharge function wherein the energy discharged during a maintenance discharge cycle is provided to the host power rail and consumed by the host system load instead of being dissipated as heat.

Description of Related Art

Energy storage systems may utilize energy storage cells, for example banks of batteries, as the energy storage media. Where engagement of the energy storage system is a rare event, for example where the energy storage system is part of an uninterruptible power supply (UPS), regular maintenance discharge/charge cycles of the energy storage cells may be required to maintain optimal charge level and/or verify continued energy storage cell viability.

Maintenance discharge/charge cycles are typically performed by a maintenance discharge control 25 circuit of the battery management system, for example as shown in FIG. 1. The thermal discharge control 25 circuit routes the energy stored in the energy storage cells 1 to a load resistor 3 which dissipates the stored energy as heat. This heat generation may in turn consume additional energy if the heat generated by the load resistor 3 must be further removed from the system area by the surrounding air conditioning apparatus. Once discharged to the desired energy level, the energy storage cells 1 are then re-charged by conventional charge control 10 circuitry.

Competition within the electrical power storage industry has focused attention upon increasing reliability, system uptime, energy cell longevity and overall system energy and cost efficiencies.

Therefore, it is an object of the invention to provide an energy storage system that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
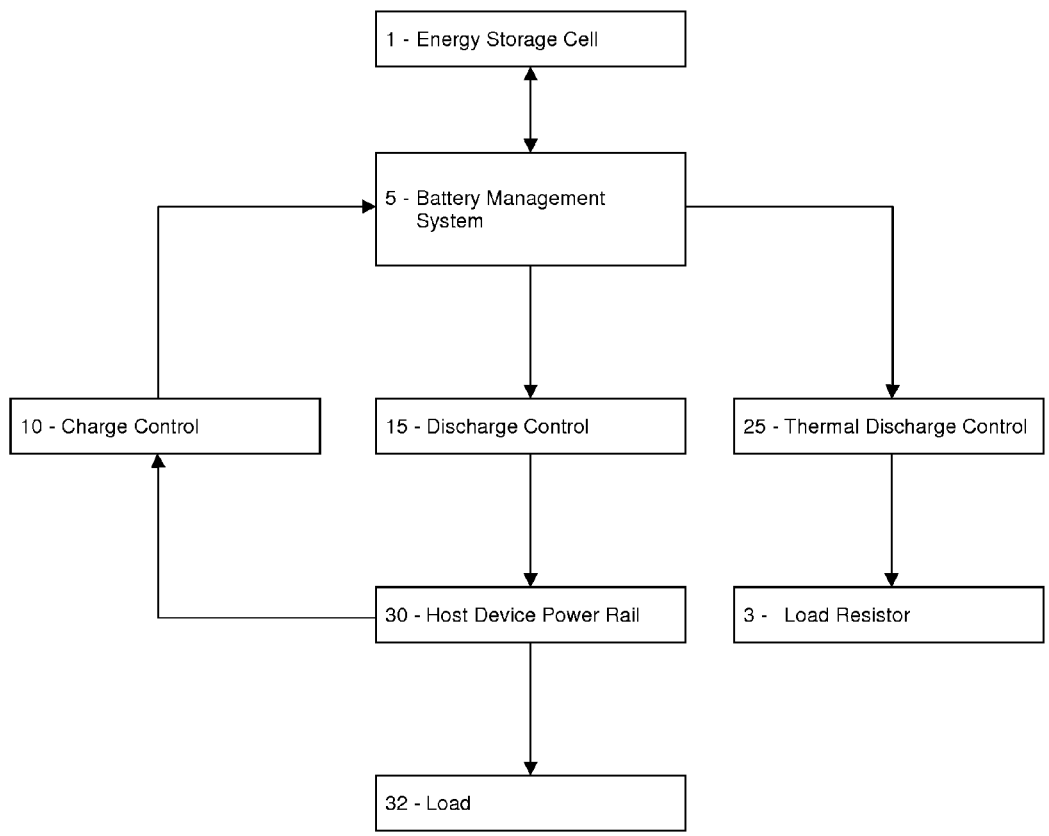
FIG. 1 is a schematic diagram of a prior art energy storage system utilizing a load resistor for maintenance cycle discharge.

The inventor has recognized that energy stored in energy storage cells 1, traditionally dissipated via a load resistor 3 during conventional maintenance discharge cycles (See FIG. 1), may instead be utilized by transforming the discharged energy for voltage and current compatibility and delivering this energy to the host power rail 30 for use, improving overall system energy efficiency.

Figure 2:
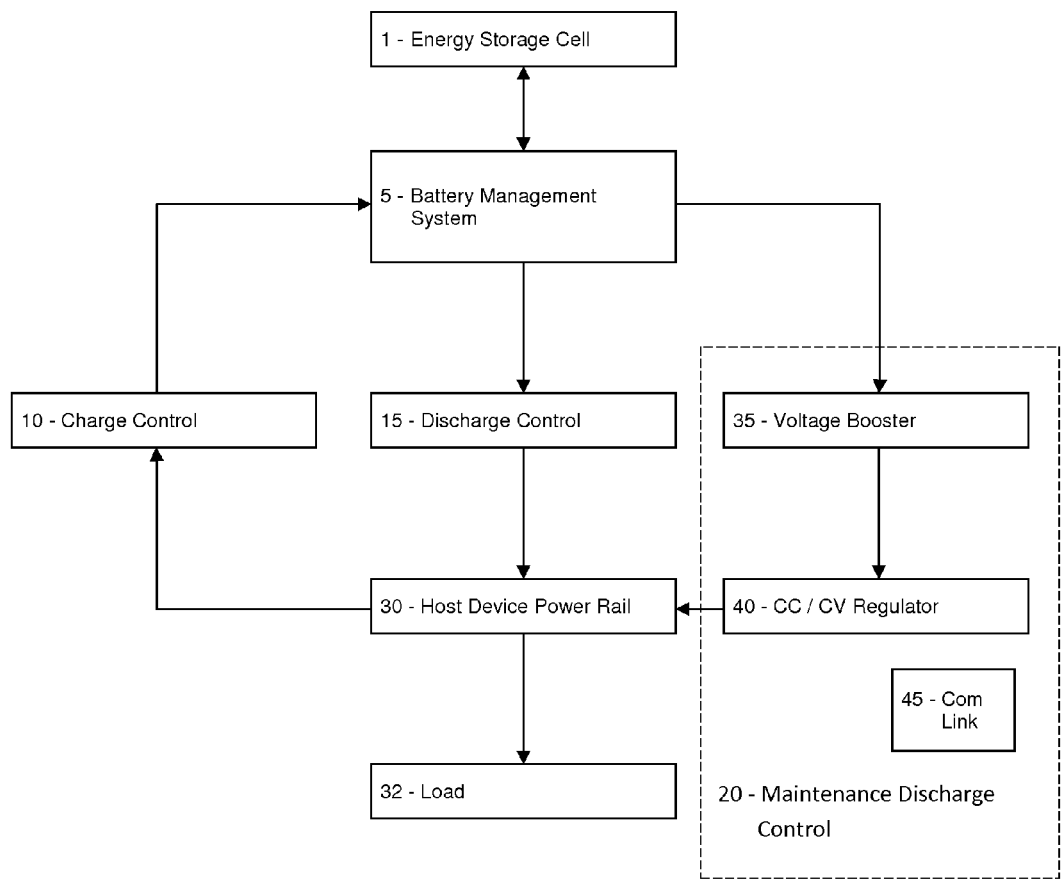
FIG. 2 is a schematic diagram of an energy storage system with maintenance discharge to the host device power rail/load.

An exemplary energy storage system with green maintenance discharge functionality is shown in FIG. 2. Conventional elements include one or more energy storage cells 1 under the control of a battery management system 5 operable to activate/monitor each of charge control 10, discharge control 15 and maintenance discharge control 20 circuitry. The energy storage cells 1 may include, for example, banks of batteries of different types and/or chemistries.

The battery management system 5 selects the operational mode of the energy storage cells 1, aggregating energy storage cell 1 telemetry from the energy storage cells 1, such as voltage, current, cycle count and temperature and monitoring for out of range conditions. Further inputs to the battery management system 5 may include feedback from the charge, discharge and maintenance discharge circuitry, the host power rail and any attached loads.

Charge control 10 circuitry, including a host power supply, energized by the host power rail 30, is known in the art and as such is not further disclosed herein. Similarly, discharge control 15 circuitry operable to supply the desired operating voltage and current from the energy storage cells 1 to the host power rail 30 and any loads 32 attached thereto is also known in the art and as such is not further disclosed herein. The host power rail 30 includes an actively sourcing power supply and an actively sinking power load.

The maintenance discharge control 20 circuitry includes a voltage booster 35 feeding a constant current/constant voltage (CC/CV) regulator 40. The voltage booster 35 is operable to raise an output voltage of the energy storage cell(s) 1 to feed a CC/CV regulator 40 an input voltage greater than a voltage of the host power rail 30. Thereby, the energy storage cell 1 output voltage is sufficient to energize the CC/CV regulator 40 to provide a selected maximum voltage and corresponding maximum current to the host power rail 30, even if the energy storage cell 1 output voltage approaches or is less than the voltage of the host power rail 30.

The maximum voltage set-point of the CC/CV regulator 40 may be, for example, the maximum voltage inputable to a host power supply of the charge control 10 or other load upon the host power rail 30. The maximum current set-point of the CC/CV regulator 40 may be selected, for example, with respect to a maximum maintenance discharge rate of the selected energy storage device 1. One skilled in the art will appreciate that the presence of the voltage booster 35 enables deep discharge of the energy storage device 1 to voltage levels significantly below the voltage of the host power rail 30, which may be desirable depending upon, for example, the type of battery configuration and/or chemistry of the energy storage device(s) 1 selected for the maintenance discharge cycle.

The CC/CV regulator 40 may be provided, for example, as a buck converter circuit with a switching action driven by separate feedback loops corresponding to monitored voltage and current delivered to the host power rail 30. Depending upon the sensed voltage level at the host power rail 30, the buck converter of the CC/CV regulator 40 may source the maximum constant current at the sensed host power rail voltage, as long as the host power rail voltage is below the constant voltage limit.

The selected CC/CV regulator 40 may include an integrated communication link 45 functionality, such as $I^2C$ Bus protocol, enabling adjustment of the maximum voltage and/or current set-points during a maintenance discharge cycle. For example, a monitored status such as temperature levels and/or individual energy storage cell voltages sensed by the battery management system 5 may be used as inputs to select/vary the maximum voltage and/or current set-points applied by the CC/CV regulator 40 during the maintenance discharge cycle.

The maintenance discharge cycle may be continued until the CC/CV regulator 40 no longer receives enough over voltage from the voltage booster 35 to provide the voltage and corresponding current to the host power rail 30 at desired levels, indicating that the electrical storage device 1 charge has been depleted to a level such that the maintenance discharge cycle has been completed. Alternatively, the battery management system 5 may disable the maintenance discharge cycle upon satisfying, for example, a monitored voltage of the energy storage device 1 and/or a selected time limit or temperature.

One skilled in the art will appreciate that because the maintenance discharge cycle utilizes the energy discharged from the energy storage cell(s) 1 rather than merely burning it off as waste heat through a load resistor, overall system energy and cost efficiency may be increased. Further, because the maintenance discharge cycle may be operated at maximum CC/CV for the entirety of the maintenance discharge cycle, the overall maintenance discharge cycle time may be reduced compared to utilizing a conventional load resistor of fixed resistance, improving the energy storage system uptime.

| Table of Parts | |
| --- | --- |
| 1 | energy storage cell |
| 3 | load resistor |
| 5 | battery management system |
| 10 | charge control |
| 15 | discharge control |
| 20 | maintenance discharge control |
| 25 | thermal discharge control |
| 30 | host power rail |
| 35 | voltage booster |
| 40 | CC/CV regulator |
| 45 | communication link |

Where in the foregoing description reference has been made to ratios, integers or components having known equivalents then such equivalents are herein incorporated as if individually set forth.

While the present invention has been illustrated by the description of the embodiment thereof, and while the embodiment has been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept.

Further, it is to be appreciated that improvements and/or modifications may be made thereto without departing from the scope or spirit of the present invention as defined by the following claims.

I claim:

1. An energy storage system, comprising
    an energy storage cell coupled to a battery management system provided with a charge control circuit, a discharge control circuit and a maintenance discharge control circuit;
    the maintenance discharge control circuit including a voltage booster coupled to a constant current/constant voltage (CC/CV) regulator;
    each of the charge control circuit, the discharge control circuit and the maintenance discharge control circuit coupled between the battery management system and a host power rail;
    the battery management system operable to enable each of the charge control circuit, the discharge control circuit and the maintenance discharge control circuit for interconnection with the energy storage cell;
    whereby the maintenance discharge control circuit is adapted to perform a deep discharge cycle upon the energy storage cell.

2. The energy storage system of claim 1, wherein the voltage booster is operable to raise a voltage from the energy storage cell to a CC/CV regulator input voltage greater than a voltage of the host power rail.

3. The energy storage system of claim 1, wherein the CC/CV regulator is a buck converter feedback loop.

4. The energy storage system of claim 3, wherein the CC/CV regulator has both current and voltage feedback loops.

5. The energy storage system of claim 1, wherein the CC/CV regulator is operable to deliver a maximum voltage and a maximum current to the host power rail.

6. The energy storage system of claim 1, wherein the CC/CV regulator includes an integrated communications link.

7. The energy storage system of claim 6, wherein the battery management system is operative to provide a set-point to the CC/CV regulator via the integrated communications link.

8. The energy storage system of claim 1, wherein the battery management system is operable to perform a maintenance discharge cycle until the CC/CV regulator no longer receives a voltage greater than a voltage of the host power rail.

9. A method for maintenance discharge of an energy storage cell coupled to a battery management system provided with a charge control circuit, a discharge control circuit and a maintenance discharge control circuit coupled between the battery management system and a host power rail, comprising:
    passing an output voltage of the energy storage cell through a voltage booster and into a constant current/constant voltage (CC/CV) regulator of the maintenance discharge control circuit to perform a deep discharge cycle upon the energy storage cell;
    the voltage booster raising the output voltage of the energy storage cell above a voltage of the host power rail; and
    delivering a selected maximum voltage from the CC/CV regulator to the host power rail until the energy storage cell is discharged to a desired power level.

10. The method of claim 9, wherein the CC/CV regulator is a buck converter feedback loop.

11. The method of claim 10, wherein the CC/CV regulator has both current and voltage feedback loops.

12. The method of claim 9, wherein the CC/CV regulator is configured to limit a maximum current and a maximum voltage delivered to the host power rail.

13. The method of claim 9, wherein the selected maximum voltage is delivered until the CC/CV regulator no longer receives a voltage greater than a voltage of the host power rail.

14. The method of claim 9, wherein the selected maximum voltage is delivered until a pre-selected minimum output voltage of the energy storage cell is detected.

15. The method of claim 14, wherein the minimum output voltage is determined by a battery chemistry of the energy storage cell.

16. The method of claim 9, wherein the selected maximum voltage is delivered until a pre-selected temperature of the energy storage cell is detected.

17. The method of claim 9, wherein the selected maximum voltage is delivered until a pre-selected time interval has passed.

18. The method of claim 9, wherein the CC/CV regulator includes an integrated communications link.

19. The method of claim 18, further including a battery management system monitoring a status of the energy storage cell and providing a set-point to the CC/CV regulator via the integrated communications link.

20. The method of claim 19, wherein the status of the energy storage cell includes at least one of an energy storage cell voltage, current, cycle count or temperature.

\* \* \* \* \*